United States Patent [19]
Hamada et al.

[11] Patent Number: 5,940,832
[45] Date of Patent: Aug. 17, 1999

[54] DYNAMIC DATABASE STRUCTURING METHOD AND APPARATUS, AND DATABASE CLUSTERING METHOD AND APPARATUS

[75] Inventors: Takeo Hamada; Takafumi Chujo; Mitsuhiro Azuma; Kohei Iseda, all of Kawasaki, Japan

[73] Assignee: Fujitsu Limited, Kanagawa, Japan

[21] Appl. No.: 08/394,798

[22] Filed: Feb. 27, 1995

[30] Foreign Application Priority Data

Mar. 10, 1994 [JP] Japan ................................ 6-039396

[51] Int. Cl.$^6$ .................................................. G06F 17/30
[52] U.S. Cl. ...................... 707/100; 707/205; 707/200; 707/101; 711/114
[58] Field of Search ............................ 395/600; 707/200, 707/205, 100, 101, 5, 6; 711/114

[56] References Cited

U.S. PATENT DOCUMENTS

| | | | |
|---|---|---|---|
| 4,905,163 | 2/1990 | Garber et al. | 364/513 |
| 4,912,648 | 3/1990 | Tyler | 395/61 |
| 4,937,803 | 6/1990 | Nakane | 369/32 |
| 4,949,323 | 8/1990 | Yoshida | 369/32 |
| 4,982,344 | 1/1991 | Jordan | 364/521 |

(List continued on next page.)

FOREIGN PATENT DOCUMENTS

| | | | |
|---|---|---|---|
| 63-228244 | 3/1987 | Japan | G06F 12/00 |
| 62-239248 | 10/1987 | Japan . | |
| 63-228244 | 9/1988 | Japan . | |
| 1-237854 | 9/1989 | Japan . | |
| 2-212949 | 8/1990 | Japan . | |
| 2-222044 | 9/1990 | Japan . | |
| 4-116736 | 4/1992 | Japan . | |
| 4-199338 | 7/1992 | Japan . | |
| 4-280328 | 10/1992 | Japan . | |

OTHER PUBLICATIONS

Kernighan et al., "An efficient Heuristic procedure for partioning Graphs", Bell Syst. Tech. J., vol. 49, No. 2, pp. 76–780, Feb. 1990.
T.C. Hu and K. Moerder "Multiterminal flows in a hypergraph," Dept. of Elec. and computer Science, university of California, pp. 86–93, Dec. 1984.
B. W. Kernighan and S. Lin, "An efficient procedure for partitioning graphs," bell Syst. Tech. J., Feb. 1970.
"ITU–T Recommendation M.3100: Generic Network Information Model", Oct. 1992.
Shimizu et al., "Implementation of MIB for TNMS Kernel by Object Oriented Database", Technical Report of IEICE CS93–115, pp. 17–23, Oct. 1993.
Kiriha et al., "Object Oriented Management Information Base",Technical Report of IEICE CS93–99, Oct. 1993.
Kernighan et al., "An Efficient Heuristic Procedure for Partitioning Graphs", Bell Systems Technical Journal, vol.49, No.2, pp. 291–307, Feb. 1970.
Ullman, "Principles of Database Systems", Second Edition, Computer Science Press, date unknown.
Kung et al., "On Optimistic Methods for Concurrency Control", ACM Transactions on Database Systems, vol. 6, No. 2 pp. 213–226, Jun. 1981.
Effelsberg et al., "Principles of Database Buffer Management", ACM Transactions on Database Systems, vol. 9, No.4, pp. 560–595, Dec. 1984.

*Primary Examiner*—Thomas G. Black
*Assistant Examiner*—Jean M. Corrielus
*Attorney, Agent, or Firm*—Helfgott & Karas, PC.

[57] ABSTRACT

A dynamic database structuring method includes the steps of (a) clustering transition probabilities among transactions by on-line, (b) forming a hyper graph representing the transition probabilities of the transactions clustered in the step (a) using weighting, (c) partitioning the hyper graph to obtain clustering information related to objects or records to be stored in a storage, and (d) reorganizing a database by rearranging data in the storage by on-line using the clustering information obtained in the step (c), thereby restructuring the database dynamically.

18 Claims, 7 Drawing Sheets

U.S. PATENT DOCUMENTS

| | | | |
|---|---|---|---|
| 4,992,972 | 2/1991 | Brooks et al. | 364/DIG. 2 |
| 5,021,976 | 6/1991 | Wexelblat et al. | 395/159 |
| 5,123,057 | 6/1992 | Verly et al. | 382/37 |
| 5,220,640 | 6/1993 | Frank | 395/2 |
| 5,241,620 | 8/1993 | Ruggiero | 395/22 |
| 5,241,645 | 8/1993 | Cimral et al. | 395/500 |
| 5,263,167 | 11/1993 | Conner, Jr. et al. | 395/700 |
| 5,278,703 | 1/1994 | Rub et al. | 369/32 |
| 5,297,124 | 3/1994 | Plotkin et al. | 369/32 |
| 5,297,249 | 3/1994 | Bernstein et al. | 395/156 |
| 5,394,382 | 2/1995 | Hu et al. | 369/32 |
| 5,446,891 | 8/1995 | Karplan et al. | 395/600 |
| 5,448,727 | 9/1995 | Annevelink | 395/600 |
| 5,553,280 | 9/1996 | Fortier | 395/600 |

F I G. 2

|  | # of occur. | $T_0$ | $T_1$ | ... | $T_n$ |
|---|---|---|---|---|---|
| $T_0$ | 1 3 4 | 3 | 1 2 | ... | 2 |
| $T_1$ | 2 1 2 3 | 2 3 | 0 | ... | 2 4 4 |
| ⋮ | ⋮ | ⋮ | ⋮ | ⋮ | ⋮ |
| $T_n$ | 4 4 2 | 3 | 1 2 2 | ... | 1 3 |

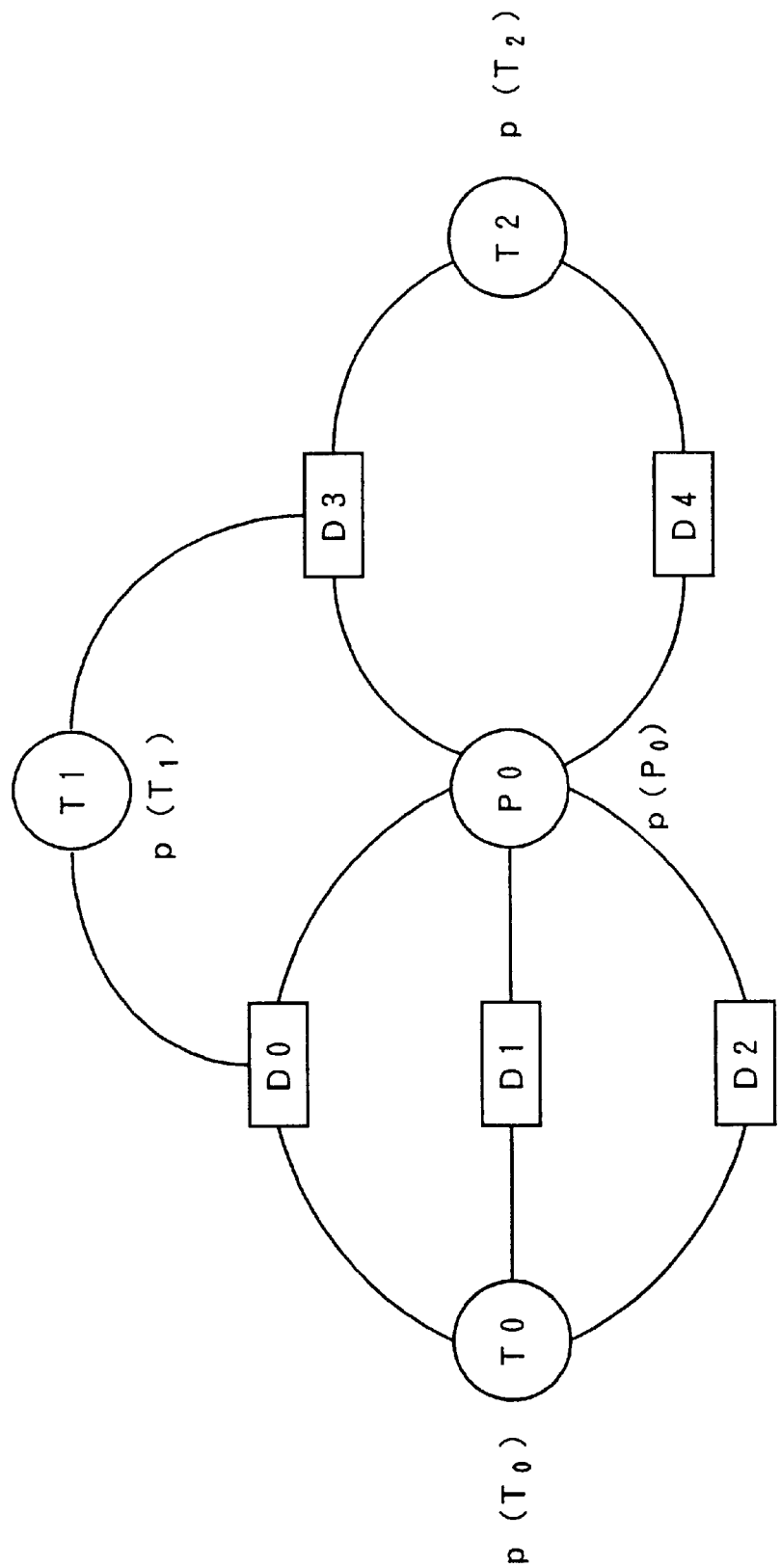
F I G. 3

DYNAMIC DATABASE STRUCTURING METHOD AND APPARATUS, AND DATABASE CLUSTERING METHOD AND APPARATUS

BACKGROUND OF THE INVENTION

The present invention generally relates to dynamic database structuring methods and apparatuses and database clustering methods and apparatuses, and more particularly to dynamic database structuring method and apparatus which carry out dynamic structuring of an object oriented database and to database clustering method and apparatus which physically cluster objects of the object oriented database by on-line.

The demands for communications to be made in broader bands with higher reliability are stimulating the development of communication network management. As an international standard for the network management, Recommendations related to the Telecommunications Management Network (TMN) has been made in the International Telecommunication Union Telecommunication Standardization Sector (ITU-T). The ITU-T Recommendation is described in "ITU-T Recommendation M.3100: Generic Network Information Model".

Management information used in the communication network management is a collection of information related to states of equipments, connected states of the communication network and the like in real-time. Due to the nature of such information, the amount of such information becomes large within a short period of time, and the management of such information is difficult when only the memory capacity of a main storage of a normal computer is used. In addition, when the operation of the equipment included in the communication network is interrupted by an unexpected accident or the like, it is necessary to take measures so that the operation can be resumed from the record of the management information.

For the above reasons, a database management system is used to record and manage the management information used for the communication network management. The types of databases used may roughly be categorized into a relational database and an object oriented database. Both the relational database and the object oriented database have been used for the communication network management. Examples of such are proposed in Shimizu et al., "Implementation of MIB for TNMS Kernel by Object Oriented Database, Technical Report of IEICE", CS93-115, pp. 17–23, October 1993, and Kiriba et al., "Object Oriented Management Information Base", Technical Report of IEICE CS93-99.

Normally, the unit of data input to and output from a disk is called a record in the case of the relational database, and is called an object in the case of the object oriented database. The object oriented database can normally store a complex data structure that is represented using a pointer, for example, as it is, into the database. For this reason, the management information can be represented easily in the case of the object oriented database, and it is regarded that the object oriented database is useful for the network management.

In this case, the seek time of a head with respect to the disk takes up the majority of the information input/output time. Accordingly, a technique has been proposed to reduce the access time by physically clustering the data within the database on the disk.

Next, a description will be given of examples of the prior art.

A Japanese Patent Application No.62-239248 (hereinafter referred to as Seki et al.) proposes a physical clustering system for data in a database structure that uses the shadow paging technique. According to Seki et al., the empty regions on the disk are secured so that the physical page in the disk unit called the current version and the page called the backup version become consecutive.

A Japanese Laid-Open Patent Application No.63-228244 (hereinafter referred to as Takeda) proposes clustering for arranging records having the parent-and-child relationship in consecutive regions.

A Japanese Laid-Open Patent Application No. 1-237854 (hereinafter referred to as Sekine) proposes a clustering control system for the case where the data on the disk are aligned using a binary tree.

A Japanese Laid-Open Patent Application No. 2-222044 (hereinafter referred to as Kashio) proposes a clustering technique using the parent-and-child relationship among the data, and a database restructuring method using a table indicative of the correspondence of points of an old database and a new database.

A Japanese Laid-Open Patent Application No. 2-212949 (hereinafter referred to as Kishimoto et al.), A Japanese Laid-Open Patent Application No. 4-116736 (hereinafter referred to as Asano) and a Japanese Laid-Open Patent Application No. 4-199338 (hereinafter referred to as Aoyagi) propose database restructuring methods applied during operation of the database, that is, applied to the on-line operation.

A Japanese Laid-Open Patent Application No. 4-280328 (hereinafter referred to as Kimura) proposes a clustering system for class objects represented by the binary tree.

In the object oriented database, the size of the object is not necessarily constant, and a plurality of objects may be stored in one physical page. For this reason, since the clustering is made in units of pages according to Seki et al., the memory capacity of the disk is wasted when applied to the object oriented database. In addition, because the access to the data is made in units of objects, a large effect may not always be obtained by the clustering in the units of pages.

On the other hand, in the transaction of the actual communication network management, the units of data subject to the read/write access in one transaction, that is, the records or objects, do not necessarily satisfy the parent-and-child relationship, and in this case, the access pattern of the units of data greatly differs from the parent-and-child relationship. Hence, it is impossible to reduce the input/output time of the access to the data according to Takeda.

According to Sekine, the data in the binary tree are aligned by a specific key value, and the adjacent data in the binary tree do not necessarily have a high correlation when making the access in the actual transaction process. Thus, it is impossible in this case to reduce the input/output time of the access to the data according to the Sekine.

In addition, according to Kashio, Kishimoto et al. or Aoyagi, the clustering is made using the parent-and-child relationship. For this reason, Kashio, Kishimoto et al. and Aoyagi have the same problems as Takeda described above. Furthermore, according to Kashio, the restructuring of the database is made after establishing the corresponding relationships of the pointers, and consequently, the operation of the database must be stopped and the restructuring must be made by off-line.

On the other hand, according to Asano, the standard for the clustering is not clear. The actual input/output of the disk greatly differs depending on the cluster generating method, and it is not always possible to reduce the input/output time. In addition, it is necessary to provide a storage region for a reorganizing database, independently of the database storage region.

Furthermore, according to Kimura, the standard for the clustering is determined depending on the relationship of the classes that is similar to the parent-and-child relationship. Hence, it is evident that the problems of Takeda and Sekine described above will also occur in Kimura.

SUMMARY OF THE INVENTION

Accordingly, it is a general object of the present invention to provide novel and useful dynamic database structuring method and apparatus and database clustering method and apparatus, in which the problems described above are eliminated.

Another and more specific object of the present invention is to provide a dynamic database structuring method comprising the steps of (a) clustering transition probabilities among transactions by on-line, (b) forming a hyper graph representing the transition probabilities of the transactions clustered in the step (a) using weighting, (c) partitioning the hyper graph to obtain clustering information related to objects or records to be stored in a storage, and (d) reorganizing a database by rearranging data in the storage by on-line using the clustering information obtained in the step (c), thereby restructuring the database dynamically. According to the dynamic database structuring method of the present invention, it is possible to obtain an optimum data arrangement in the storage such as a disk, by appropriately representing the relationship of the transactions and the data and the correlation of the transactions. In addition, since the statistical information is clustered by on-line to make the dynamic rearrangement, it is possible to greatly reduce the processing time when carrying out the non-standard transaction process in real-time. For this reason, it is possible to improve the performance of the database in the communication network management. Compared to the conventional method, for example, it is possible in some cases to improve the input/output characteristic of the storage (disk) to five or more times that of the conventional case.

Still another object of the present invention is to provide a database clustering method comprising the steps of (a) clustering transition probabilities among transactions by on-line, (b) forming a hyper graph representing the transition probabilities of the transactions clustered in the step (a) using weighting, (c) partitioning the hyper graph to obtain clustering information related to objects or records to be stored in a storage, (d) successively updating the partitioning of the hyper graph based on correlation information that is indicative of correlation among the transactions and is obtained by forming the hyper graph, and (e) reorganizing a database by rearranging data in the storage by on-line using the clustering information obtained in the step (c), thereby restructuring the database dynamically and automatically clustering the database. According to the database clustering method of the present invention, it is possible to obtain an optimum data arrangement in the storage such as a disk, by appropriately representing the relationship of the transactions and the data and the correlation of the transactions. In addition, since the statistical information is clustered by on-line to make the dynamic rearrangement, it is possible to greatly reduce the processing time when carrying out the non-standard transaction process in real-time. For this reason, it is possible to improve the performance of the database in the communication network management. Compared to the conventional method, for example, it is possible in some cases to improve the input/output characteristic of the storage (disk) to five or more times that of the conventional case.

A further object of the present invention is to provide a dynamic database structuring apparatus comprising storage means for storing a database, a database management system, coupled to the storage means, managing the database, clustering means, coupled to the database management system, for clustering transition probabilities among transactions by on-line, and database reorganizing means, coupled to the database management system, comprising means for forming a hyper graph representing the transition probabilities of the transactions clustered in the clustering means using weighting, means for partitioning the hyper graph to obtain clustering information related to objects or records to be stored in the storage means, and means for reorganizing the database by rearranging data in the storage by on-line using the clustering information obtained in the clustering means, thereby restructuring the database dynamically. According to the dynamic database structuring apparatus of the present invention, it is possible to obtain an optimum data arrangement in the storage such as a disk, by appropriately representing the relationship of the transactions and the data and the correlation of the transactions. In addition, since the statistical information is clustered by on-line to make the dynamic rearrangement, it is possible to greatly reduce the processing time when carrying out the non-standard transaction process in real-time. For this reason, it is possible to improve the performance of the database in the communication network management. Compared to the conventional method, for example, it is possible in some cases to improve the input/output characteristic of the storage (disk) to five or more times that of the conventional case.

Another object of the present invention is to provide a database clustering apparatus adapted to cluster a database stored in a storage, comprising a database management system managing the database, clustering means, coupled to the database management system, clustering transition probabilities among transactions by on-line, and database reorganizing means, coupled to the database management system, comprising means for forming a hyper graph representing the transition probabilities of the transactions clustered in the clustering means using weighting, means for partitioning the hyper graph to obtain clustering information related to objects or records to be stored in the storage, means for successively updating the partitioning of the hyper graph based on correlation information that is indicative of correlation among the transactions and is obtained by forming the hyper graph, and means for reorganizing the database by rearranging data in the storage by on-line using the clustering information obtained in the clustering means, thereby restructuring the database dynamically and automatically clustering the database. According to the database clustering apparatus of the present invention, it is possible to obtain an optimum data arrangement in the storage such as a disk, by appropriately representing the relationship of the transactions and the data and the correlation of the transactions. In addition, since the statistical information is clustered by on-line to make the dynamic rearrangement, it is possible to greatly reduce the processing time when carrying out the non-standard transaction process in real-time. For this reason, it is possible to improve the performance of the database in the communication network management. Compared to the conventional method, for example, it is possible in some cases to improve the input/output characteristic of the storage (disk) to five or more times that of the conventional case.

Other objects and further features of the present invention will be apparent from the following detailed description when read in conjunction with the accompanying drawings.

BRIEF DESCRIPTION OF THE DRAWINGS

FIG. 2 is a diagram showing a representation format of transitions among transactions in a transition probability clustering unit;

FIG. 3 is a hyper graph representing correlation information among the transactions;

DESCRIPTION OF THE PREFERRED EMBODIMENTS

In order to carry out a highly reliable network management, it is necessary to realize a database structuring method that takes into consideration the real-time nature of the communication, and the present invention is made to meet such a demand.

As industrial fields to which the present invention may be applied, it is expected that the present invention will be particularly useful when applied to the database that is used for communication network management wherein there are demands to carry out non-standard transaction processes in real-time.

With regard to the physical storage of data on the disks, it may be understood that the physical clustering and the dynamic database structuring method of the present invention can be applied to both the relational database and the object oriented database, because the records in the relational database and the objects in the object oriented database are equivalent.

First, a description will be given of the operating principle of the present invention, by referring to FIG. 1.

Figure 1:
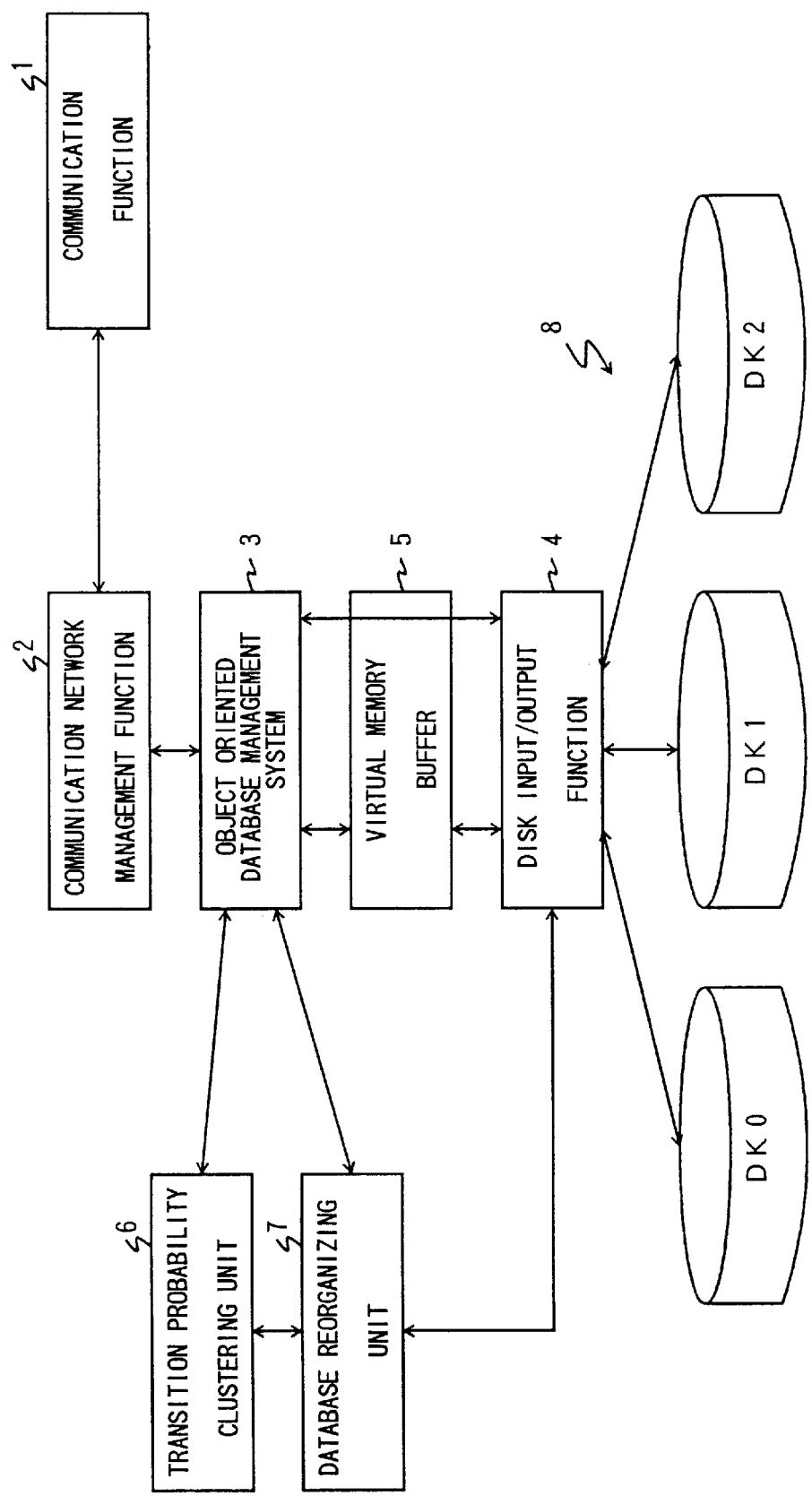
FIG. 1 is a system block diagram for explaining the operating principle of the present invention.

In FIG. 1, a communication function 1 exchanges messages with other nodes in the communication network. A communication network management function 2 manages the communication network. An object oriented database management system 3 stores management information related to the communication network. A disk input/output function 4 inputs data to and outputs data from disk units DK0, DK1 and DK2 which will be referred to as a disk 8 for the sake of convenience. A virtual memory buffer 5 exchanges data between the object oriented database management system 3 and the disk input/output function 4. It is possible to use a real memory buffer in place of the virtual memory buffer 5. A transition probability clustering unit 6 clusters by on-line statistical information related to the transition probabilities among the transactions. A database reorganizing unit 7 rearranges the data stored in the disk 8 and restructures an object oriented database that is managed by the object oriented database management system 3. The object oriented database of the object oriented database management system 3 is formed by the disk 8.

According to one aspect of the present invention, transition probabilities among transactions are clustered by on-line, and the clustered transition probabilities among the transactions are represented by forming a hyper graph that uses weighting in an object oriented database. This hyper graph is partitioned so as to obtain clustering information of objects to be stored on disks. A dynamic structuring of the object oriented database is made by reorganizing the object oriented database by rearranging the data on the disks on-line using the clustering information.

In this first case, it is possible to successively update the division of the hyper graph depending on correlation information among the transactions obtained by forming the hyper graph.

According to another aspect of the present invention, there is provided a transition probability clustering unit 6 which clusters by one-line the transition probabilities among the transactions in the object oriented database management system 3, and the database reorganizing unit 7. This database reorganizing unit 7 represents the clustered transition probabilities among the transactions by forming the hyper graph that uses the weighting, and obtains the clustering information of the objects to be stored on the disk 8 by partitioning the hyper graph. In addition, the database reorganizing unit 7 makes a dynamic structuring of the object oriented database is made by reorganizing the object oriented database by rearranging the data on the disk 8 by on-line using the clustering information.

In this latter case, the database reorganizing unit 7 may successively update the division of the hyper graph depending on correlation information among the transactions obtained by forming the hyper graph.

In the present invention, even if the initial arrangement of the data on the disks is not an optimum arrangement, the arrangement of the data will asymptotically approach the optimum arrangement by clustering statistical information according to the lapse of time. The transition probability clustering unit 6 has a function of clustering by on-line the statistical information related to the transition probabilities among the transactions in the object oriented database management system 3. The database reorganizing unit 7 represents the transition probabilities among the transactions by forming the hyper graph that uses the weighting, by using the information from the transition probability clustering unit 6. The database reorganizing unit 7 obtains the clustering information of the objects to be stored on the disk 8 by partitioning the hyper graph, and reorganizes the object oriented database by rearranging the data on the disk 8 by on-line using the clustering information. In addition, the database reorganizing unit 7 successively updates the division of the hyper graph that uses the weighting depending on the correlation information among the transactions. The results of the operation of the database reorganizing unit 7 are reflected as the data arrangement in the disk units DK0, DK1 and DK2 of the disk 8, and the results are notified to the object oriented database management system 3.

FIG. 2 is a diagram showing a representation format of the transitions among transactions in the transition probability clustering unit 6 shown in FIG. 1. The functions of the transition probability clustering unit 6 can be realized by use of a general processor and a memory, and information representing the transitions among the transactions is recorded in a table of the memory in the format shown in FIG. 2. In FIG. 2, $T_0$ through $T_n$ denote kinds of the transactions, and each individual transaction corresponds to a management function unit such as an accounting process and a call setting process in the case of the communication network management, for example.

A first column indicated by "# of occur." in FIG. 2 indicates at each line the total number of occurrences of a corresponding one of the transactions $T_0$ through $T_n$. In other words, the number "134" at the first line of the first column indicates that the transaction $T_0$ was started 134 times. Columns following the first column respectively indicate the number of occurrences of the transactions following the transaction indicated by the same line. For example, the number "23" at the second line of the second column indicated by "$T_0$"indicates that the transaction $T_0$ was started 23 times following the transaction $T_1$ that was started 2123 times.

Accordingly, in the particular case shown in FIG. 2, the transaction $T_0$ was started a total of 134 times, and the number of times the transactions $T_0, T_1, \ldots, T_n$ were started following the transaction $T_0$ respectively are "3", "12", ..., "2" as indicated on the first line. The transition probability clustering unit 6 obtains the information related to the transaction every time the object oriented database management system 3 starts the transaction, and updates the contents of the table shown in FIG. 2.

The functions of the database reorganizing unit 7 can be realized by use of a general processor and a memory. When representing the transition probabilities among the transactions that are clustered by on-line, the hyper graph is used to represent the correlation information among the transactions on the memory.

FIG. 3 shows a hyper graph representing the correlation information among the transactions. Such a hyper graph is often used to represent electrical circuits. In FIG. 3, D0 through D4 correspond to nodes in the electrical circuit representation, and represent the individual data within the object oriented database. In FIG. 3, T0 through T2 and P0 correspond to multiple terminal networks in the electrical circuit representation, where T0 through T2 represent the transactions, and P0 represents the correlation among the transactions. These multiple terminal networks are weighted by probabilities such as $p(T_0), p(T_1), p(T_2), p(P_0)$ or the like.

The above hyper graph can be represented on the memory more easily compared to the normal method using pointers. The method of calculating from FIG. 2 the representation shown in FIG. 3 and the probabilities used to weight the multiple terminal network will be described later.

In the database reorganizing unit 7, in order to obtain the clustering information of the objects to be stored on the disk 8 by partitioning the hyper graph, the circuit partitioning technique is applied with respect to the representation shown in FIG. 3 so as to determine the optimum arrangement of the individual data on the disk 8. The optimum arrangement refers to an arrangement that minimizes the input to and output from the disk 8 when the correlation among the transactions expected from FIG. 2 exists. The reason why such an optimum arrangement is obtained by the circuit partitioning technique will be described later. Various circuit partitioning techniques are known, and an example of such is proposed in Kernighan et al., "An Efficient Heuristic Procedure for Partitioning Graphs", Bell Systems Technical Journal, Vol. 49, No. 2, pp. 291–307, February 1970.

As a result of the circuit partitioning, the database reorganizing unit 7 obtains a set of data to be accommodated within the same page on the disk 8. At the same time, the disk input/output function 4 manages the empty pages on the disk 8, and the database reorganizing unit 7 can obtain the new page number of each data and the address within the page using the information that is related to the empty pages and is obtained from the disk input/output function 4.

In the object oriented database management system 3, a commit process is carried out to write the data within the virtual memory at a corresponding position on the disk 8 when the transaction accompanying the write normally ends.

Figure 4:
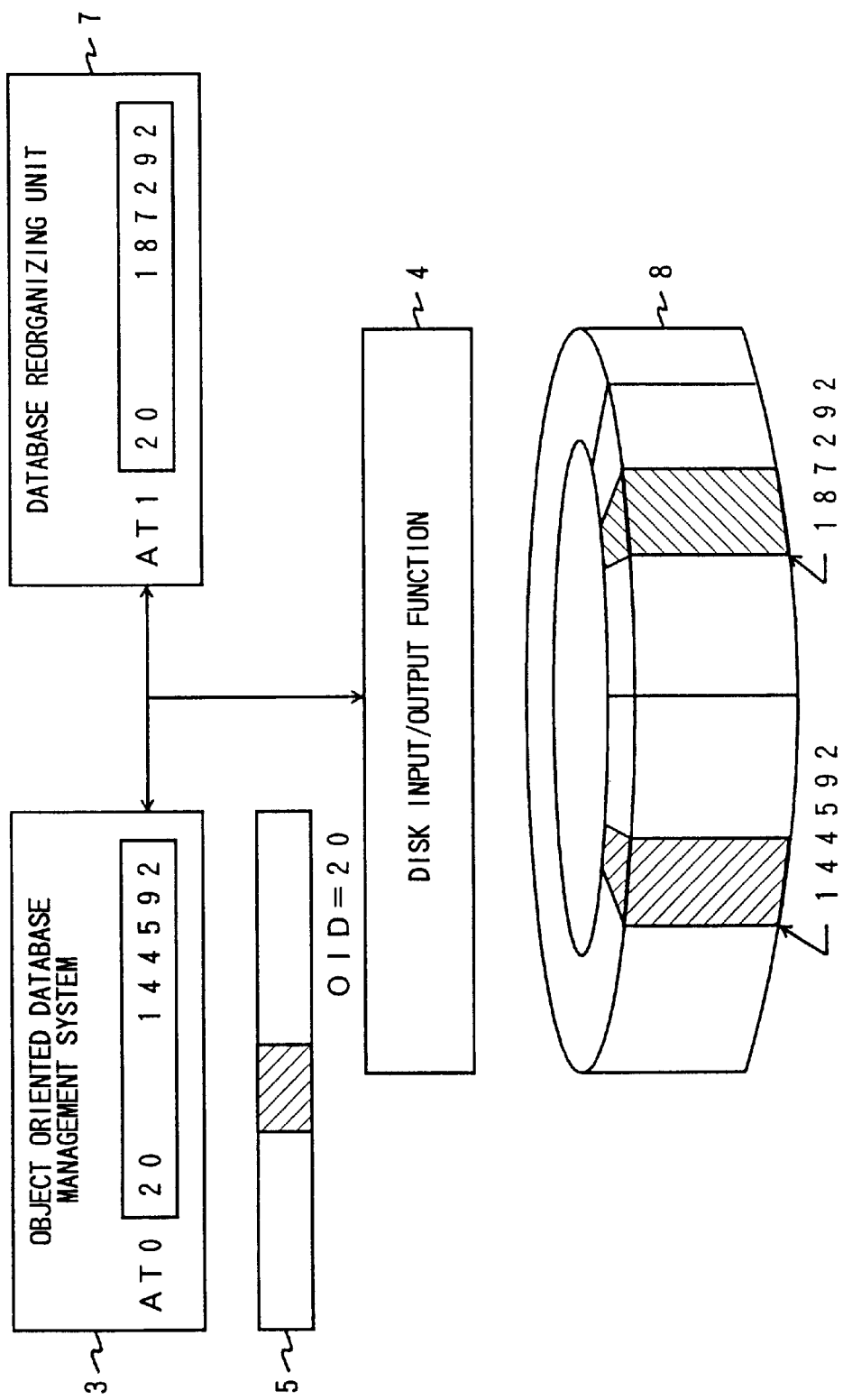
FIG. 4 is a diagram showing a change of an address on a disk during a data write.

FIG. 4 is a diagram showing a change of the address on the disk 8 during the data write. In FIG. 4, those parts which are the same as those corresponding parts in FIG. 1 are designated by the same reference numerals. FIG. 4 shows the function of reorganizing the object oriented database in the database reorganizing unit 7 by rearranging the data on the disk 8 by on-line, without interrupting the operation of the object oriented database, using the clustering information that is related to the objects stored on the disk 8 and is obtained by partitioning the hyper graph.

In the object oriented database, each object is given a unique number called an object ID (OID). FIG. 4 shows a case where the write operation is carried out for the object having the OID which is OID=20. The object oriented database management system 3 and the database reorganizing unit 7 respectively have tables AT0 and AT1 which indicate the correspondence of the OIDs and the addresses on the disk 8. The tables AT0 and AT1 respectively indicate the present address information and the new address information.

The object oriented database management system 3 makes an inquiry regarding the address information to the database reorganizing unit 7 before writing the data, and writes the new address if the address is different from the present address. In this state, the write operation is carried out according to the following procedure.

(1) The data is written at the new address "187292" according to the new address information of the table AT1.

(2) The information of the table AT0 within the object oriented database management system 3 is changed to the new address.

(3) A notification is made to the disk input/output function 4 so as to update the empty regions corresponding to the old address and the new address depending on the movement of data.

In order to prevent a discrepancy from occurring during the movement of the data, it is necessary to restrict other transactions from making a read/write with respect to the same data. Such a restrictive control with respect to the transactions is called a concurrency control. It is known from Ullman, "Principles of Database Systems", Second Edition, Computer Science Press, Rockville, Md. 1982, and Kung et al., "On Optimistic Methods for Concurrency Control", ACM Trans. on Database Systems, Vol. 6, No. 2, pp. 213–216, June 1981 that such a concurrency control can be realized using means such as the normal lock or critical region.

Therefore, according to the present invention, the movement of the data occurs with the write operation at the time of the commit process. Hence, the dynamic restructuring of the object oriented database is carried out little by little for the entire time period of use of the object oriented database. For this reason, although there is an increase in the load with respect to the computer which executes the transactions by carrying out the restructuring of the object oriented database, the required process does not greatly differ from the process necessary to make the write operation for the commit process during the normal transaction process. Accordingly, the restructuring of the object oriented database essentially will not make the user recognize the increase in the load with respect to the computer.

The start of the transaction and the statistical information related to the transition thereof are recorded by on-line in the transition probability culstering unit 6. In the database reorganizing unit 7, the partitioning of the hyper graph is successively updated depending on the correlation information among the transactions, so as to obtain the clustering of the objects to be stored on the disk 8. In other words, by updating within the database reorganizing unit 7 the representation of the correlation information among the transactions represented in FIG. 3 at predetermined time intervals, it is possible to cope with the timewise variation.

The predetermined time intervals at which the correlation information is updated are set arbitrarily and to several tens of minutes, for example. Hence, it is possible to prevent the load on the computer from becoming too large.

The optimum data arrangement on the disk 8 changes due to the updating of the correlation information among the transactions, but the change in the arrangement is extremely small if the change in the correlation information is small. Thus, it is sufficient to successively change the data arrangement by applying again the circuit partitioning only with respect to the part where a change occurred relative to the correlation information.

Accordingly, the change in the correlation information is represented as a change in the weighting of the multiple terminal network on the graph by holding the partitioned result of the hyper graph, and the network can be partitioned successively.

Figure 5:
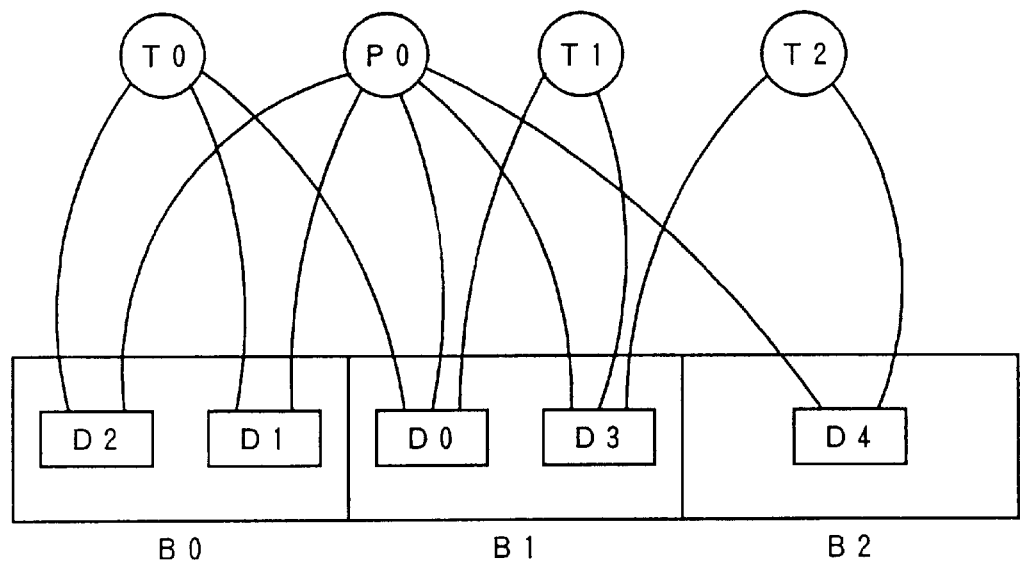
FIG. 5 is a diagram showing a representation of a partitioned result of the hyper graph.

FIG. 5 is a diagram showing the representation of the partitioned result of the hyper graph. In FIG. 5, B0, B1 and B2 represent pages on the disk 8. FIG. 5 shows the data included in each of the pages B0, B1 and B2 and their representation by the hyper graph.

The description given above explains the dynamic restructuring of the present invention with respect to the object oriented database. However, the dynamic restructuring of the present invention can also be applied similarly to the relational database by considering the records of the relational database as the objects of the object oriented database.

In order to realize a certain management function in the communication network management, messages including management information are exchanged among a plurality of nodes in the communication network. In this state, the side which starts the management function is called a manager, and the side which provides the management information is called an agent. The manager and the agent are described for example in "ITU-T Recommendation M.3100: Generic Network Information Model" described above.

The management information on the agent side is called a managed object (MO). The managed object (MO) gives the specification of the input and output and the behavior thereof with respect to the physical or logical managed object in the communication network management, and the specification is written in a kind of programming language called GDMO which is described for example in "ITU-T Recommendation M.3100: Generic Network Information Model". Hence, the management function of the communication network management can be represented by a sequence including the exchange of management information between the manager and the agent.

Figure 6:
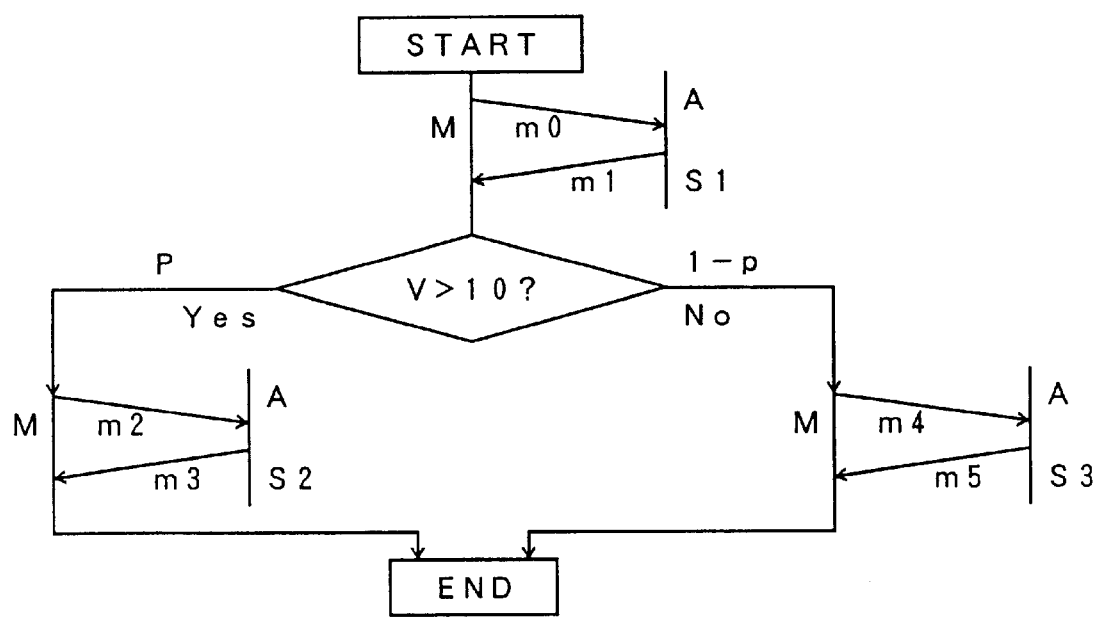
FIG. 6 is a diagram showing a management function sequence.

FIG. 6 shows a management function sequence. In FIG. 6, M denotes the manager and A denotes the agent. The manager M makes an enquiry to the agent A by a message m0. When the agent A carries out a process S1, the agent A returns a result of this process S1 to the manager M by a message m1. For example, the message m0 may be regarded as a communication time of a specific call.

Next, the manager M requests the agent A to carry out a process in accordance with a value of a result V of the inquiry. In this particular case, it is possible to consider a case where a decision is made to determine whether or not the communication time exceeded 10 minutes, and a change of the accounting process is requested to the agent A if the decision result is YES. In other words, a branch shown on the left in FIG. 6 is executed if the decision result is YES, so as to request a process S2 to change the accounting process. On the other hand, if the decision result is NO, a branch shown on the right in FIG. 6 is executed so as to request a process S3 to update the statistical information related to the communication time of the call that is connected.

In this particular case, if the management information at the agent A is managed using the object oriented database as shown in FIG. 1, the processes S1, S2 and S3 respectively generate a transaction process request with respect to the object oriented database.

If it is assumed for the sake of convenience that the result V satisfies V>10, the left branch shown in FIG. 6 is executed with a probability p and the right branch shown in FIG. 6 is executed with a probability 1−p, there is a correlation represented by the Markov chain between the transactions that are successively started on the agent A.

Figure 7:
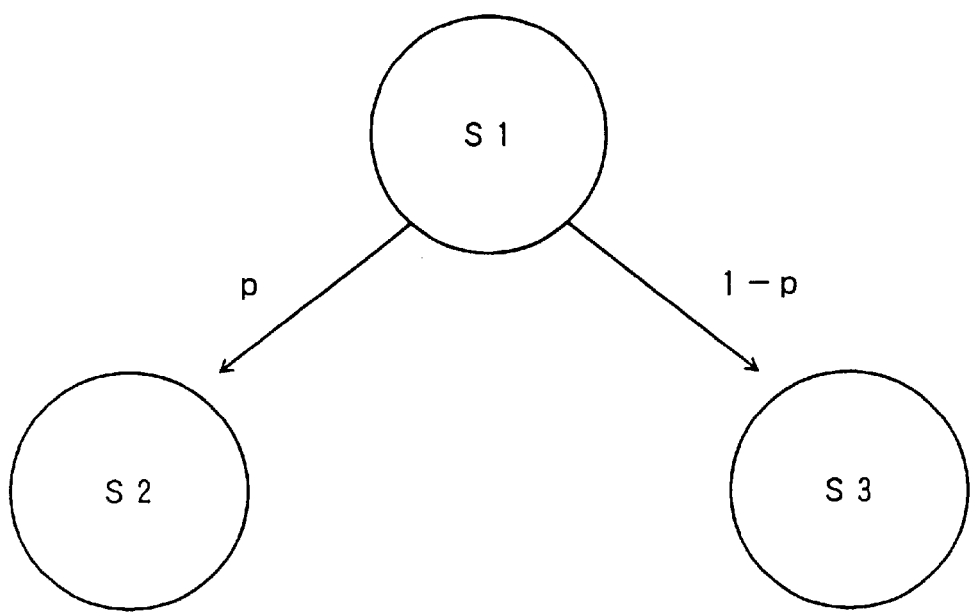
FIG. 7 is a diagram showing a Markov chain among the transactions.

FIG. 7 is a diagram showing a Markov chain among the transactions. In FIG. 7, S1, S2 and S3 respectively denote the transactions corresponding to the processes S1, S2 and S3 described above. In addition, p denotes a transition probability with which a transition from the transaction S2 to the transaction S2 will occur, and 1−p denotes a transition probability with which a transition from the transaction S1 to the transaction S3 will occur.

The management function sequence in the actual communication network management is by far more complicated than that shown in FIG. 7. In addition, the relationship of the manager and the agent is not necessarily a one-to-one relationship. In other words, process requests may be generated from a plurality of independent managers with respect to the management information related to the agent. However, when attention is drawn to the relationship between the individual manager and the agent, it may be regarded that the Markov chain representation shown in FIG. 7 can be made.

In the transaction process fo the object oriented database using the virtual memory buffer 5, the data in the virtual memory buffer 5 is used if the data accessed during the transaction exists within the virtual memory buffer 5. On the other hand, if the concerned data accessed during the transaction does not exist in the virtual memory buffer 5, the page on the disk 8 including the concerned data is read into the virtual memory buffer 5. In this state, it is assumed for the sake of convenience that the virtual memory buffer 5 is managed by a buffer management algorithm such as the least recently used (LRU) algorithm described in Effelsberg et al., "Principles of Database Buffer Management", ACM Trans. on Database Systems, Vol. 9, No. 4, pp. 560–595, December 1984.

When the transaction process normally ends, the commit process is carried out at the end to update the contents of the database. In this state, when the value of the data changes during the transaction, it is necessary to write the content of the change at a corresponding position on the disk 8. In this case, if the related data are gathered in a small number of pages on the disk 8 with respect to the transaction, it is possible to reduce the number of pages input to and output from the disk 8.

For example, from the partitioned result shown in FIG. 5, a disk page including a data set D(T1)={D0, D3} with respect to the transaction T1 is B1, and the number of pages required for the input and output is 1 page at the most.

More generally, if a certain transaction is denoted by T, the data set thereof is denoted by D(T), and the data is given a certain arrangement on the disk 8, a set of pages including the data set D(T) determined by the certain arrangement is represented by P(D(T)).

Out of the pages included in the set P(D(T)), the rate of the page being included within the virtual memory buffer 5 is referred to as a hit rate $P_h$ of the virtual memory buffer 5 that is described by the following formula, where No. denotes the number of pages included in the virtual memory buffer 5.

$$P_h = (No.)/|P(D(T))|$$

Hence, the number R(T) of pages which must be read into the virtual memory buffer 5 can be described by the following formula.

$$|R(T)| = (1-P_h) \cdot |P(D(T))|$$

The hit rate $P_h$ described above is determined by the size of the virtual memory buffer 5, the buffer management algorithm, the history of the transactions and the like.

On the other hand, a rate $P_w$ of the pages including the data which must be written at the time of the commit process can be described by the following formula where NO. denotes the number of pages which must be written.

$$P_w = (NO.)/|P(D(T))|$$

Therefore, a number W(T) of pages which must be written on the disk 8 can be described by the following formula, where the rate $P_w$ is determined by the process carried out by the transaction or the data arrangement.

$$|W(T)| = P_w \cdot |P(D(T))|$$

Accordingly, a number #IO(T) of input/output pages can be obtained from the following formula.

$$\#IO(T) = |R(T)| + |W(T)| = (1-P_h-P_w) \cdot |P(D(T))|$$

In other words, it may be seen that the number #IO(T) of input/output pages is to the first degree proportional to the amount |P(D(T))| which is determined by the data arrangement on the disk 8.

First, a description will be given of the relationship of the transaction and the data, which relationship is represented by the hyper graph (also called a W_graph) which is weighted by the probability.

Figure 8:
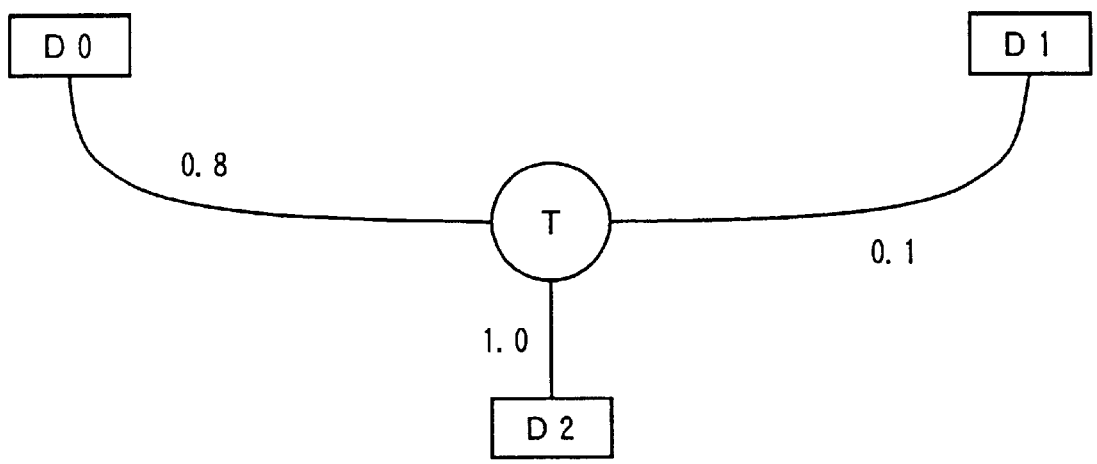
FIG. 8 is a diagram showing a W_graph representation of the relationship of the transactions and data.

FIG. 8 shows the W_graph representation of the relationship of the transaction and the data. FIG. 8 represents the relationship of a transaction T and 3 data $D_0$, $D_1$ and $D_2$ using the W_graph. In this case, the weighting at each edge of the W_graph represents the probability with which the corresponding data is accessed by starting the transaction T.

Figure 9:
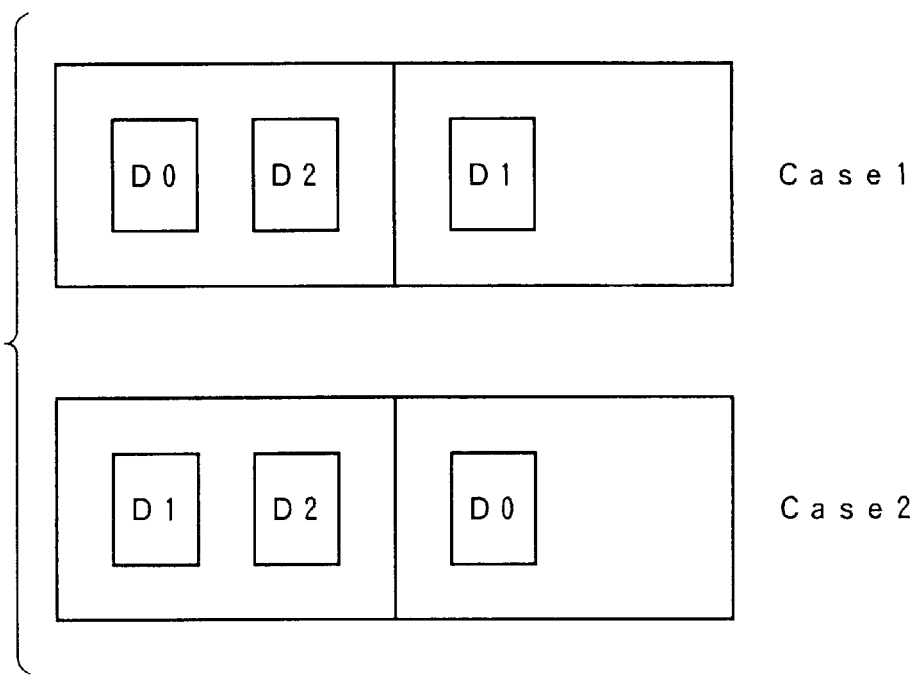
FIG. 9 is a diagram showing the relationship of the data arrangement and weighting by probability.

FIG. 9 shows the relationship of the data arrangement and weighting by probability for 2 cases, namely, a Case 1 and a Case 2. When an expected value of the amount |P(D(T))| described above is obtained for these 2 cases, the following results are obtained.

Case 1: E[|P(D(T))|]=1.0+0.1=1.1
Case 2: E[|P(D(T))|]=1.0+0.8=1.8

In these 2 cases, the weighting at each edge clearly corresponds to the increase (or amount of increase) of the amount E[|P(D(T))|].

As may be seen from the 2 cases described above, the amount E[|P(D(T))|] increases depending on the weighting of the edge of the W_graph traversing the boundary of the pages when partitioning the data at the boundaries of the disk pages. In order to minimize the amount E[|P(D(T))|], the partitioning is obtained such that the weighting of the edge of the W_graph traversing the page boundary becomes a minimum.

Therefore, it is possible to appropriately represent the relationship of the data in the transaction process by using the W_graph.

Next, a description will be given of a method of representing the correlation among the transactions using the W_graph. First, as shown in FIG. 2, the transition probabilities among the transactions such as those shown in FIG. 7 are calculated immediately from the statistical information clustered by on-line. In the case shown in FIG. 2, it may be estimated that the probabilities of the transition from the transaction $T_0$ to the transactions $T_0, T_1, \ldots, T_n$ respectively are 3/134, 12/134, . . . , 2/134.

FIG. 3 shows an example of the representation of the estimated transition probabilities using the W_graph. In FIG. 3, it is assumed that the transition probability from the transaction $T_0$ to the transaction $T_2$ is given, and the representation using a pseudo net P0 having this probability as the weighting. In FIG. 3, $P(P_0)$ represents the transition probability between the transactions T0 and T2.

If the relationship of the transaction and the data are considered similarly, the input/output of the page accompanying the transition of the transaction is proportional to $|P(D(T_0)+D(T_2))|$, and it may be seen that the expected value $E[|P(D(T_0)+D(T_2))|]$ thereof increases in correspondence with the weighting at the edge of the W_graph traversing the boundary of the pages, similarly to the case shown in FIG. 9.

Hence, in order to minimize the expected value $E[|P(D(T_0)+D(T_2))|]$, the partitioning that minimizes the weighting at the edge of the W_graph traversing the boundary of the pages is obtained.

A description will now be given of a case where the transactions are started from a plurality of managers with respect to the agent. As described above, it is possible to represent the transition between each individual manager and the agent using the W_graph. When the transactions are started in parallel by the plurality of managers, it may also be regarded that the above described argument stands as it is for each of the individual transactions if the virtual memory buffer 5 is sufficiently large and the size of the data sets of the individual transactions are such that the data sets can simultaneously exist within the virtual memory buffer 5. For the transactions requested in the normal communication network process, it may be regarded that the size of the virtual memory buffer 5 is sufficiently large compared to the data sets related to the transactions.

In the description given heretofore, the present invention is applied to the communication network management. However, it is of course possible to apply the present invention to other cases where the transitions among the transactions can be represented by the Markov chain, and effects similar to those described above can also be expected in such cases.

Figure 10:
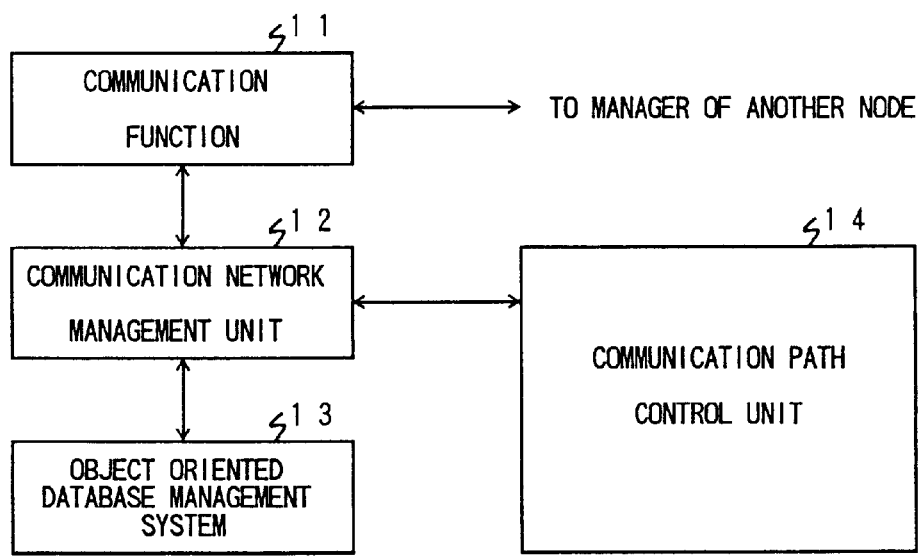
FIG. 10 is a system block diagram for explaining an embodiment of the present invention.

Next, a description will be given of an embodiment of the present invention, by referring to FIG. 10. FIG. 10 shows this embodiment, more particularly, the construction of the agent in the communication network management system employing the present invention.

In FIG. 10, a communication function 11 carries out a communication with a manager of another node via a communication network (not shown). A communication network management unit 12 carries out the communication network management function shown in FIG. 1. An object oriented database management system 13 is similar to the object oriented database management system 3 shown in FIG. 1 that manages the object oriented database. A communication path control unit 14 controls the communication path and is made up of a cross-connect unit, a switching unit or the like.

The communication function 11 transmits the request from the manager of another node to the communication network management unit 12. The communication network management unit 12 returns the management information which is the result of the process at the agent to the manager of the request source. The object oriented database management system 13 carries out dynamic structuring of the object oriented database as described above in conjunction with FIG. 1, and the object oriented database stores the management information. The communication network management unit 12 supervises the state of the communication path control unit 14 if necessary, and stores the supervision information in the object oriented database as the communication network management information, so that this communication network management information can be provided upon request from the manager of another node.

Further, the present invention is not limited to these embodiments, but various variations and modifications may be made without departing from the scope of the present invention.

What is claimed is:

1. A dynamic database structuring method comprising the steps of:
   (a) clustering transition probabilities among transactions according to statistical information of previously occurring on-line, transactions;
   (b) forming a hyper graph representing the transition probabilities of the transactions clustered in said step (a) using weighting;
   (c) partitioning said hyper graph to obtain clustering information including an optimum arrangement for objects or records to be stored in a database; and
   (d) reorganizing the database by rearranging the object or records stored according to the clustering information obtained in said step (c), thereby restructuring the database dynamically.

2. The dynamic database structuring method as claimed in claim 1, which further comprises the steps of:
   (e) successively updating the partitioning of said hyper graph based on correlation information that is indicative of correlation among the transactions and is obtained by forming said hyper graph.

3. The dynamic database structuring method as claimed in claim 2, wherein said database is selected from a group consisting of an object oriented database and a relational database.

4. The dynamic database structuring method as claimed in claim 1, wherein said database is selected from a group consisting of an object oriented database and a relational database.

5. The dynamic database structuring method as claimed in claim 1, wherein the clustering transition probabilities step includes storing transitions of transactions in a predetermined format.

6. The dynamic database structuring method as claimed in claim 5, wherein the clustering transition probabilities step further includes storing an additional transition for every new transaction started.

7. The dynamic database structuring method as claimed in claim 1, wherein the hyper graph is formed by calculating the transition probabilities among the transactions from statistical information clustered on line.

8. A database clustering method comprising the steps of:
   (a) clustering transition probabilities among transactions according to statistical information of previously occurring on-line, transactions;
   (b) forming a hyper graph representing the transition probabilities of the transactions clustered in said step (a) using weighting;
   (c) partitioning said hyper graph to obtain clustering information including an optimum arrangement for objects or records to be stored in a database; and
   (d) successively updating the partitioning of said hyper graph based on correlation information that is indicative of correlation among the transactions and is obtained by forming said hyper graph; and
   (e) reorganizing the database by rearranging the objects or records stored according to the clustering information obtained in said step (c), thereby restructuring the database dynamically and automatically clustering the database.

9. The database clustering method as claimed in claim 5, wherein said database is selected from a group consisting of an object oriented database and a relational database.

10. A dynamic database structuring apparatus comprising:
    storage means for storing a database;
    a database management system, coupled to said storage means, managing the database;
    clustering means, coupled to said database management system, for clustering transition probabilities among transactions according to statistical information of previously occurring on-line transactions; and
    database reorganizing means, coupled to said database management system, comprising:
       means for forming a hyper graph representing the transition probabilities of the transactions clustered in said clustering means using weighting,
       means for partitioning said hyper graph to obtain clustering information including an optimum arrangement for objects or records to be stored in said storage means, and
       means for reorganizing the database by rearranging the objects or records in said storage means according to the clustering information obtained in said partitioning means, thereby restructuring the database dynamically.

11. The dynamic database structuring apparatus as claimed in claim 10, wherein said database reorganizing means further comprises means for successively updating the partitioning of said hyper graph based on correlation information that is indicative of correlation among the transactions and is obtained by forming said hyper graph.

12. The dynamic database structuring apparatus as claimed in claim 11, wherein said database is selected from a group consisting of an object oriented database and a relational database.

13. The dynamic database structuring apparatus as claimed in claim 10, wherein said database is selected from a group consisting of an object oriented database and a relational database.

14. The dynamic database structuring apparatus as claimed in claim 10, wherein the clustering means includes second storage means for storing transactions of transactions in a predetermined format.

15. The dynamic database structuring apparatus as claimed in claim 10, wherein the clustering means stores an additional transition for every new transaction started.

16. The dynamic database structuring apparatus as claimed in claim 10, wherein the hyper graph forming means calculates transition probabilities among the transactions from statistical information clustered on line.

17. A database clustering apparatus adapted to cluster a database stored in a storage means, comprising:

a database management system managing the database;

clustering means, coupled to said database management system, for clustering transition probabilities among transactions according to statistical information of previously occurring on-line transactions; and database reorganizing means, coupled to said database management system, comprising:

means for forming a hyper graph representing the transition probabilities of the transactions clustered in said clustering means using weighting, means for partitioning said hyper graph to obtain clustering information including an optimum arrangement for objects or records to be stored in storage means.

means for successively updating the partitioning of said hyper graph based on correlation information that is indicative of correlation among the transactions and is obtained by forming said hyper graph, and means for reorganizing the database by rearranging the objects or records in the storage means according to the clustering information obtained in said partitioning means, thereby restructuring the database dynamically and automatically clustering the database.

18. The database clustering apparatus as claimed in claim 17, wherein said database is selected from a group consisting of an object oriented database and a relational database.

* * * * *